Patented Aug. 17, 1954

2,686,788

UNITED STATES PATENT OFFICE 2,686,788

PROCESS FOR THE PRODUCTION OF NITRO PHENYL AMINO DIOL DERIVATIVES

Allen C. Moore, Grosse Pointe Woods, and George W. Moersch, Detroit, Mich., assignors to Parke, Davis & Company, Detroit, Mich., a corporation of Michigan No Drawing. Application December 12, 1950, Serial No. 200,488

12 Claims. (Cl. 260—327)

This invention relates to a process for the production of nitrophenyl amino diol derivatives. More particularly, the invention relates to a process for the production of 1-nitrophenyl-2-aminopropane-1,3-diol derivatives having the formula,

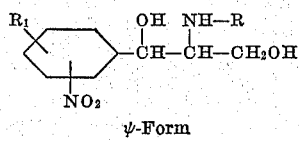

ψ-Form where R is hydrogen or an acyl radical and $R_1$ is hydrogen, halogen, a lower alkyl or a lower alkoxy radical. The term "acyl" as used herein refers to carboxylic acid acyl radicals such as lower aliphatic acyl, halogenated lower aliphatic acyl, unsaturated lower aliphatic acyl, ether substituted lower aliphatic acyl, benzoyl, halogenated benzoyl, nitrated benzoyl, alkylated benzoyl, araliphatic acyl and the like radicals.

From the following description it will be apparent to those skilled in the art that both the starting materials and the products of the process exist in structural or diastero-isomeric as well as optical isomeric form. The present invention is concerned with compounds having the "pseudo" diastereoisomeric as distinguished from the "regular" diastereoismeric form. The groups on the two asymmetric carbon atoms of such pseudo diastereoisomers have the same relative spacial configuration or arrangement as the groups on the two asymmetric carbon atoms of pseudo ephedrine and threose.

Because of the difficulty in representing these structural differences in graphic formulae, the customary structural formulae will be used in both the specification and claims and a notation placed below or to the side of the formula to designate the particular structural and optical configuration of the compound. Where the notation "ψ-form" appears, as it does above, the formula is to be interpreted in its generic sense, that is, as representing the (l)-ψ and (d)-ψ isomers in separated form as well as the racemic mixture thereof. Such a formula does not merely represent the optically racemic mixture.

In accordance with the invention 1-nitrophenyl - 2 - amino-propane - 1,3 - diol derivatives having the general formula given above are produced by reacting a 1-phenyl-2-acylamidopropane-1,3-diol compound of formula,

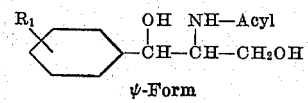

ψ-Form with a halide compound of formula,

to obtain a phenyl substituted cyclic compound of formula,

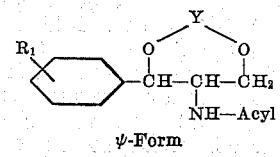

ψ-Form nitrating the phenyl ring of said cyclic compound to obtain a nitrophenyl substituted cyclic compound of formula,

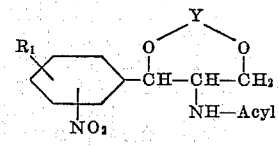

ψ-Form and hydrolyzing said nitrophenyl substituted cyclic compound; where $R_1$ has the same significance as given above, X is a halogen atom and Y is a —SO— or —CO— group.

Diagrammatically the process can be represented as follows:

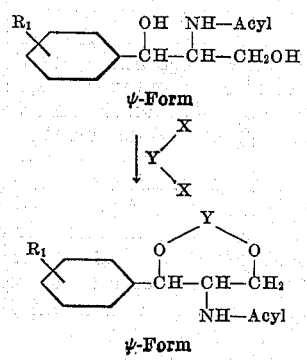

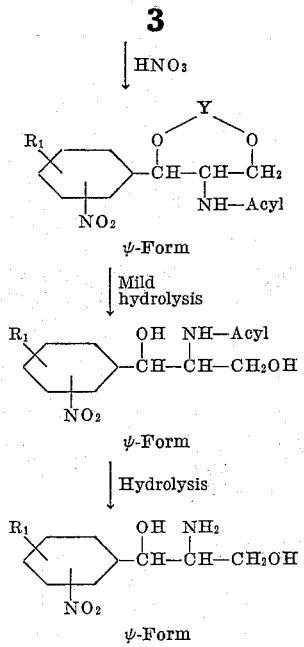

where $R_1$, X and Y have the same significance as given above.

The reaction between the halide compound and pseudo-1-phenyl-2-acylamidopropane-1,3-diol compound is carried out at a temperature below 50° C. In the case of the thionyl halides, that is, where Y is —SO—, best results are obtained at a temperature between about 20 to 35° C. while the optimal temperature for the reaction with the carbonyl halides is below about 20° C. and preferably at about —10 to +10° C. The relative quantities of the reactants can be varied within rather wide limits. However, for economic reasons, as well as ease of purification of the products, an excess of the halide compound is generally employed. In the case of the thionyl halides one of the most convenient methods for carrying out the reaction involves the use of sufficient thionyl halide to act as a reaction medium or solvent. Other solvents which may be used for the reaction between the halide compound and the pseudo-1-phenyl-2-acylamidopropane-1,3-diol compound are inert, organic solvents such as chloroform, methylene dichloride and the like. In the case of the carbonyl halides the preferred solvent for the reaction is a tertiary organic amine such as pyridine, N-ethylpiperidine, dimethylaniline, N-methylmorpholine, triethylamine and the like.

The reaction between the carbonyl halides, that is, where Y is —CO—, can also be carried out under aqueous conditions. The preferred method is, however, to carry out the reaction under anhydrous conditions as described above. In using aqueous conditions a two-phase reaction mixture is employed, that is, one phase consisting of one of the aforementioned inert organic solvents and the other consisting of water containing a weakly alkaline material such as calcium carbonate, calcium hydroxide, magnesium carbonate, sodium bicarbonate and the like to take up the hydrogen halide formed during the reaction.

The nitration of the phenyl ring of the phenyl substituted cyclic compound is carried out using fuming nitric acid, 100% nitric acid or a mixture of concentrated nitric and sulfuric acids as the nitrating agent. The temperature during the reaction should be kept below about 10° C. and preferably below —10° C.

The nitrophenyl substituted cyclic compound obtained in the nitration step of the process can be converted by mild hydrolysis to the corresponding pseudo-1-nitrophenyl-2-acylamidopropane-1,3-diol compound. This mild hydrolysis is carried out in a mixture composed of water and a water-miscible organic solvent such as methanol, ethanol, isopropanol, acetone, methyl ethyl ketone and the like using either an acidic or alkaline hydrolytic agent. As hydrolytic agents alkali metal hydroxides such as sodium hydroxide and potassium hydroxide, quaternary ammonium hydroxides such as trimethylammonium hydroxide and triethylammonium hydroxide and mineral acids such as hydrochloric acid, hydrobromic acid and sulfuric acid may be used. The temperature during the reaction is usually kept below about 50° C. although, if desired, the reaction mixture can be heated to boiling for a short time, such as ten minutes or less. Prolonged heating results in the conversion of the desired pseudo-1-nitrophenyl-2-acylamidopropane-1,3-diol compound into the corresponding pseudo-1-nitrophenyl-2-aminopropane-1,3-diol compound and hence should be avoided. Generally speaking, the desired hydrolysis proceeds quite rapidly and is usually complete from within a few minutes to one-half hour at temperatures between 20 and 50° C.

If desired, the nitrophenyl substituted cyclic compound obtained in the nitration step of the process can also be converted by hydrolysis to the corresponding pseudo-1-nitrophenyl-2-aminopropane-1,3-diol compound. This is accomplished by heating the nitrophenyl substituted cyclic compound for at least one hour with a dilute mineral acid. Best results are obtained by adding a water-miscible organic solvent to the reaction mixture to increase the solubility of the starting material and final product. The time required for the hydrolysis varies with the nature of the acyl group on the amino nitrogen atom of the nitrophenyl substituted cyclic compound. Where the acyl group is one which is easily hydrolyzed such as an acetyl or a dihaloacetyl group, the hydrolysis is usually complete at the end of the one- or two-hour heating period. However, where the acyl group is one which is more resistant to hydrolysis such as a benzoyl or substituted benzoyl group a heating period of several hours is usually required.

The products obtained by the process of the present invention are antibiotics per se or are useful intermediates for the preparation of other organic compounds possessing antibiotic activity.

The invention is illustrated by the following examples.

*Example 1*

10 g. of $(dl)$-$\psi$-1-phenyl-2-dichloroacetamidopropane-1,3-diol is added in small portions with stirring to 25 cc. of thionyl chloride. The reaction mixture is allowed to stand at room temperature for one hour and then ether added to precipitate the desired cyclic sulfite of $(dl)$-$\psi$-1-phenyl-2-dichloroacetamidopropane-1,3-diol; M. P. 118–9° C. The formula of this product is,

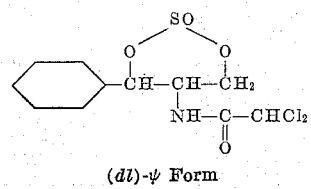

$(dl)$-$\psi$ Form 10 g. of the cyclic sulfite of (dl)-ψ-1-phenyl-2-dichloroacetamidopropane-1,3-diol is added in small portions with stirring to 50 cc. of 100% nitric acid cooled to about —30° C. by the addition of solid carbon dioxide. After the addition is completed, the reaction mixture is poured onto cracked ice and the white solid which separates collected. This product which is the cyclic sulfite of (dl)-ψ-1-p-nitrophenyl-2-dichloro-acetamidopropane-1,3-diol can be purified, if desired, by recrystallization from ethanol; M. P. 175–6° C. Its formula is,

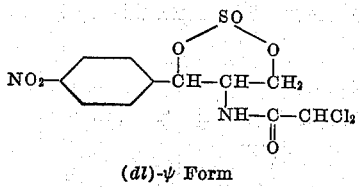

(dl)-ψ Form

Similar results are obtained by substituting fuming nitric acid or a mixture of concentrated nitric and sulfuric acids for the 100% nitric acid used in the above procedure.

2 g. of the cyclic sulfite of (dl)-ψ-1-p-nitrophenyl-2-dichloroacetamidopropane-1,3-diol is dissolved in 50 cc. of warm ethanol. 5 cc. of concentrated hydrochloric acid is added and the mixture boiled for two or three minutes. The reaction mixture is cooled, neutralized with 10% aqueous sodium hydroxide solution and evaporated on a steam bath to remove the ethanol. The aqueous residue is extracted with ethyl acetate, the ethyl acetate distilled from the extracts and the residue taken up in and recrystallized from water. The white crystalline product so obtained is (dl)-ψ-1-p-nitrophenyl-2-dichloroacetamidopropane-1,3-diol (M. P. 150° C.) of formula,

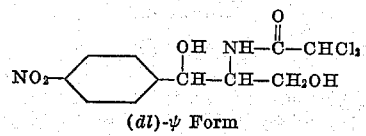

(dl)-ψ Form

The hydrolysis of the cyclic sulfite of (dl)-ψ-1-p-nitrophenyl-2-dichloroacetamidopropane-1,3-diol can also be carried out as follows:

(a) 3.7 g. of the cyclic sulfite of (dl)-ψ-1-p-nitrophenyl-2-dichloroacetamidopropane-1,3-diol is dissolved in 300 cc. of ethanol. 225 cc. of 0.1 N sodium hydroxide solution is added and the mixture allowed to stand at room temperature for one-half hour. The reaction mixture is neutralized with dilute hydrochloric acid and the ethanol distilled in vacuo. The aqueous residue is extracted with ethyl acetate, the ethyl acetate extracts combined and the ethyl acetate distilled. Recrystallization of the residue from ethylene dichloride yields the desired (dl)-ψ-1-p-nitrophenyl-2-dichloroacetamidopropane-1,3-diol in pure form; M. P. 150–1° C.

(b) 2 g. of the cyclic sulfite of (dl)-ψ-1-p-nitrophenyl-2-dichloroacetamidopropane-1,3-diol is dissolved in 65 cc. of ethanol. 5 cc. of concentrated hydrochloric acid is added and the mixture allowed to stand at room temperature for twenty minutes. The reaction mixture is neutralized with 10% aqueous sodium hydroxide solution and the ethanol distilled off in vacuo. The aqueous residue is extracted with ethyl acetate, the extracts combined and the ethyl acetate distilled. Crystallization of the residue yields the desired (dl)-ψ-1-p-nitrophenyl-2-dichloroacetamidopropane-1,3-diol; M. P. 150–1° C.

If desired, the cyclic sulfite of (dl)-ψ-1-p-nitrophenyl-2-dichloroacetamidopropane-1,3-diol can be hydrolyzed to (dl)-ψ-1-p-nitrophenyl-2-aminopropane-1,3-diol. This can be accomplished as follows:

4 g. of the cyclic sulfite of (dl)-ψ-1-p-nitrophenyl-2-dichloroacetamidopropane-1,3-diol is added to a mixture composed of 150 cc. of ethanol and 150 cc. of 5% hydrochloric acid. The resulting mixture is heated under reflux for about two hours and then evaporated to dryness in vacuo. The residual hydrochloride salt of (dl)-ψ-1-p-nitrophenyl-2-aminopropane-1,3-diol is taken up in water, the solution made alkaline with sodium hydroxide and the precipitated product collected. The crude product is recrystallized from water to obtain the desired (dl)-ψ-1-p-nitrophenyl-2-aminopropane-1,3-diol in pure form; M. P. 140.5° C. The formula of this product is:

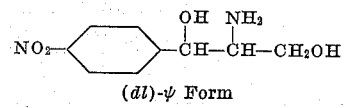

(dl)-ψ Form

Example 2

7 g. of phosgene is added slowly over a period of two hours to 9.5 g. of (dl)-ψ-1-phenyl-2-dichloroacetamidopropane-1,3-diol in 50 cc. of dry pyridine keeping the temperature in the neighborhood of 0 to 5° C. The reaction mixture is poured onto ice and the white solid cyclic carbonate of (dl)-ψ-1-phenyl-2-dichloroacetamidopropane-1,3-diol which separates collected. After washing with water and drying the product melts at 194–6° C. with decomposition. Its formula is:

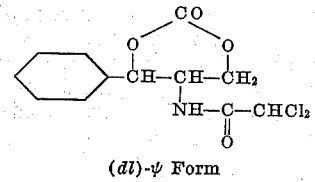

(dl)-ψ Form 9 g. of the cyclic carbonate of (dl)-ψ-1-phenyl-2-dichloroacetamidopropane-1,3-diol is added in small portions with stirring to 30 cc. of fuming nitric acid maintained at 20° C. by the addition of small portions of solid carbon dioxide. After the addition has been completed the reaction mixture is poured onto ice and the white solid product collected. The solid is recrystallized from ether and then from methanol to obtain the pure cyclic carbonate of (dl)-ψ-1-p-nitrophenyl-2-dichloroacetamidopropane-1,3-diol. This product melts poorly at 180–5° C. but analyzes correctly and upon mild hydrolysis gives a good yield of (dl)-ψ-1-p-nitrophenyl-2-dichloroacetamidopropane-1,3-diol. Its formula is:

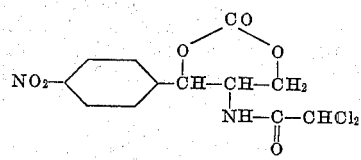

(dl)-ψ Form 2 g. of the cyclic carbonate of (dl)-ψ-1-p-nitrophenyl-2-dichloroacetamidopropane-1,3-diol is dissolved in 30 cc. of ethanol. 1 cc. of concentrated hydrochloric acid is added and the mixture allowed to stand for ten minutes at room temperature. The reaction mixture is neutralized with sodium hydroxide solution, filtered and the filtrate evaporated to dryness in vacuo. The residual gum is dissolved in ethyl acetate, the solution filtered and the ethyl acetate evaporated. Crystallization of the residual oil from water yields the desired (dl)-ψ-1-p-nitrophenyl-2-dichloroacetamidopropane-1,3-diol; M. P. 150° C. after recrystallization from ethylene dichloride. The formula of this product is,

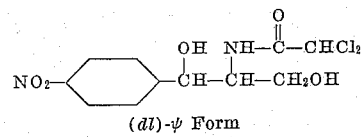

(dl)-ψ Form 2 g. of the cyclic carbonate of (dl)-ψ-1-p-nitrophenyl-2-dichloroacetamidopropane - 1,3 - diol is added to a mixture composed of 75 cc. of ethanol and 75 cc. of 5% hydrobromic acid and the reaction mixture heated under reflux for about two hours. The reaction mixture is evaporated to dryness in vacuo, the residue taken up in water and made alkaline with sodium hydroxide solution. The solution is extracted with ethyl acetate, the extracts combined and the ethyl acetate distilled. Recrystallization of the residue from water yields the desired (dl)-ψ-1-p-nitrophenyl-2-aminopropane-1,3-diol of formula,

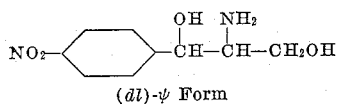

(dl)-ψ Form in pure form; M. P. 140.5° C.

*Example 3*

10 g. of (l)-ψ-1-phenyl-2-dichloracetamidopropane-1,3-diol is added in small portions with stirring to 30 cc. of thionyl chloride at room temperature. The reaction mixture is allowed to stand at room temperature for about an hour and then ether added to precipitate the desired cyclic sulfite of (l)-ψ-1-phenyl-2-dichloroacetamidopropane-1,3-diol. The formula of this product is,

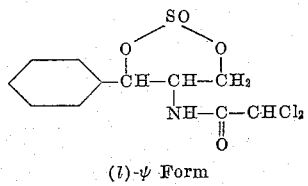

(l)-ψ Form 9.5 g. of the cyclic sulfite of (l)-ψ-1-phenyl-2-dichloroacetamidopropane-1,3-diol is added in small portions with stirring to 50 cc. of fuming nitric acid at −30° C. The temperature during the addition is maintained at about −20° C. by the addition of solid carbon dioxide. After the addition is completed, the reaction mixture is poured onto cracked ice and the white, solid cyclic sulfite of (l)-ψ-1-p-nitrophenyl-2-dichloroacetamidopropane-1,3-diol collected. After recrystallization from ethanol the pure product melts at 171-2° C. The formula of this product is,

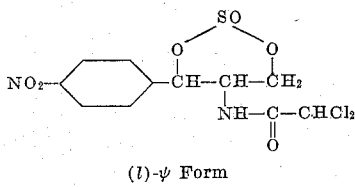

(l)-ψ Form 4 g. of the cyclic sulfite of (l)-ψ-1-p-nitrophenyl-2-dichloroacetamidopropane - 1,3 - diol is dissolved in 125 cc. of methanol. 10 cc. of concentrated hydrochloric acid is added and the mixture allowed to stand at room temperature for about twenty minutes. The reaction mixture is neutralized with 10% sodium hydroxide solution and evaporated on a steam bath to remove the ethanol. The aqueous residue is extracted with ethyl acetate, the ethyl acetate distilled from the combined extracts and the residue taken up in and recrystallized from ethyl acetate. The white crystalline product so obtained is (l)-ψ-1-p-nitrophenyl - 2 - dichloroacetamidopropane-1,3-diol; M. P. 150-1° C.; $(\alpha)_D^{25} = -25.5°$ in ethyl acetate. The formula of this product is,

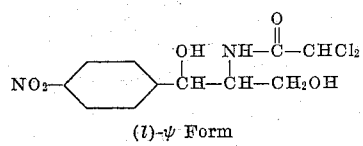

(l)-ψ Form 5 g. of the cyclic sulfite of (l)-ψ-1-p-nitrophenyl-2-dichloroacetamidopropane-1,3-diol is dissolved in a mixture composed of 150 cc. of ethanol and 150 cc. of 5% hydrochloric acid. The resulting mixture is heated under reflux for about two hours and then evaporated to dryness in vacuo. The residual hydrochloride salt of (l)-ψ-1-p-nitrophenyl-2 - aminopropane - 1,3 - diol is taken up in water, the solution made alkaline with sodium hydroxide and the product collected. The insoluble precipitate is recrystallized from water to obtain the desired (l)-ψ-1-p-nitrophenyl-2-aminopropane-1,3-diol in pure form; M. P. 162-3° C.; $(\alpha)_D^{25} = -23°$ in methanol. The formula of this product is,

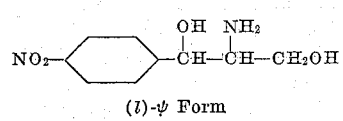

(l)-ψ Form

*Example 4*

15 g. of phosgene is added slowly over a period of three hours to 20 g. of (l)-ψ-1-phenyl-2-dichloroacetamidopropane-1,3-diol dissolved in 50 cc. of dry pyridine. During the addition the temperature is kept in the neighborhood of 0° C. After the addition has been completed, the reaction mixture is poured onto a large volume of ice and the white, cyclic carbonate of (l)-ψ-1-phenyl-2-dichloroacetamidopropane - 1,3 - diol collected and washed with water. The formula of this product is,

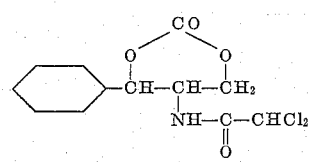

(l)-ψ Form 15 g. of the cyclic carbonate of (l)-ψ-1-phenyl-2-dichloroacetamidopropane-1,3-diol is added in small portions with stirring to 45 cc. of fuming nitric acid and −20° C. During the addition the temperature is maintained at −20° C. by the addition of small portions of solid carbon dioxide to the reaction mixture. After all of the cyclic carbonate has been added, the reaction mixture is poured onto a large volume of ice. The insoluble white cyclic carbonate of (l)-ψ-1-p-nitrophenyl-2-dichloroacetamidopropane - 1,3 - diol is collected, washed with water and recrystallized from methanol; M. P. 157° C. The formula of this product is,

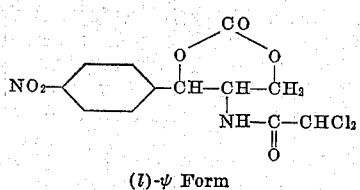

(*l*)-ψ Form 5 g. of the cyclic carbonate of (*l*)-ψ-1-nitrophenyl-2-dichloroacetamidopropane - 1,3 - diol is dissolved in 75 cc. of ethanol. 3 cc. of concentrated hydrochloric acid is added and the reaction mixture allowed to stand at room temperature for about ten minutes. The reaction mixture is neutralized with aqueous sodium hydroxide solution, filtered and the filtrate evaporated to dryness in vacuo. The residue is taken up in ethyl acetate, the solution filtered and the ethyl acetate removed by distillation. The residual oil is crystallized from water to obtain the desired (*l*)-ψ-1 - p - nitrophenyl - 2 - dichloroacetamidopropane-1,3-diol; M. P. 150–1° C. after recrystallization from ethyl acetate; $(\alpha)_D^{25} = -25.5°$ in ethyl acetate. The formula of this product is,

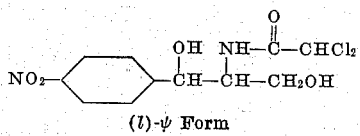

(*l*)-ψ Form 2 g. of the cyclic carbonate of (*l*)-ψ-1-p-nitrophenyl - 2 - dichloroacetamidopropane - 1,3 - diol is added to a mixture composed of 65 cc. of ethanol and 75 cc. of 5% hydrochloric acid. The reaction mixture is heated under reflux for two hours and then evaporated to dryness in vacuo. The residue is taken up in water and made alkaline with sodium hydroxide solution. The insoluble material is collected and recrystallized from water to obtain the desired (*l*)-ψ-1-p-nitrophenyl-2-aminopropane-1,3-diol of formula,

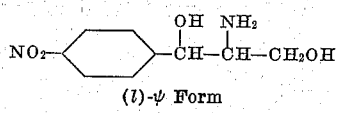

(*l*)-ψ Form in pure form; M. P. 162–3° C.; $(\alpha)_D^{25} = -23°$ in methanol.

*Example 5*

15 g. of (*dl*)-ψ-1-phenyl-2-benzamidopropane-1,3-diol is added in small portions with stirring to 50 cc. of trionyl chloride at room temperature. The reaction mixture is allowed to stand at room temperature for about an hour and then ether is added to precipitate the desired cyclic sulfite of (*dl*)-ψ-1-phenyl-2-benzamidopropane - 1,3 - dial. The formula of this product is,

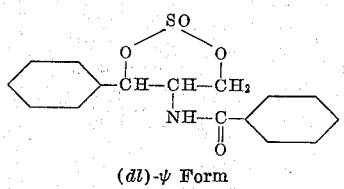

(*dl*)-ψ Form 12 g. of the cyclic sulfite of (*dl*)-ψ-1-phenyl-2-benzamidopropane-1,3-diol is added in small portions with stirring to 75 cc. of fuming nitric acid at −20° C. The temperature during the addition is maintained in the neighborhood of −20° C. by the addition of solid carbon dioxide. After the addition has been completed, the reaction mixture is poured onto a large volume of cracked ice and the white insoluble cyclic sulfite of (*dl*)-ψ-1-p - nitrophenyl - 2 - m' - nitrobenzamidopropane-1,3-diol collected. The product is washed with water and purified by recrystallization from ethanol. Its formula is,

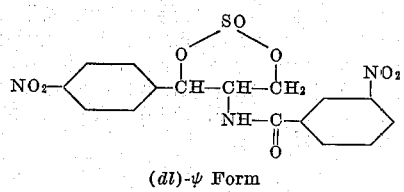

(*dl*)-ψ Form 3 g. of the cyclic sulfite of (*dl*)-ψ-1-p-nitrophenyl-2-m'-nitrobenzamidopropane - 1,3 - diol is dissolved in the minimum amount of ethanol. 8 cc. of concentrated hydrochloric acid is added and the reaction mixture heated at 35° C. for twenty minutes. The reaction mixture is cooled, neutralized with aqueous sodium hydroxide solution and the ethanol removed by distillation in vacuo. The insoluble (*dl*)-ψ-1-p-nitrophenyl-2-m'-nitrobenzamidopropane-1,3-diol of formula,

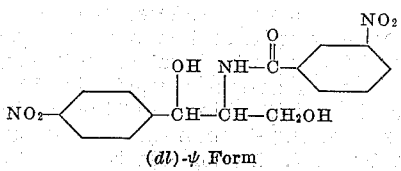

(*dl*)-ψ Form is collected, washed with water and purified by recrystallization from ethanol.

*Example 6*

10 g. of phosgene is added slowly over a period of two hours to 12 g. of (*dl*)-ψ-1-phenyl-2-acetamidopropane-1,3-diol in 65 cc. of dry pyridine. During the addition the temperature is maintained in the neighborhood of 5° C. After the addition has been completed the reaction mixture is poured onto ice and the white solid cyclic carbonate of (*dl*) - ψ - 1-phenyl-2-acetamidopropane-1,3-diol collected. The product is washed with water and dried. Its formula is,

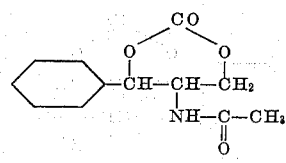

(*dl*)-ψ Form 10 g. of the cyclic carbonate of (*dl*)-ψ-1-phenyl-2-acetamidopropane-1,3-diol is added in small portions with stirring to 30 cc. of fuming nitric acid. During the addition the temperature is maintained at −15 to −20° C. by the addition of small portions of solid carbon dioxide. After the addition has been completed, the reaction mixture is poured onto ice and the white solid product collected. The product is recrystallized from methanol to obtain the pure cyclic carbonate of (*dl*)-φ-1-p-nitrophenyl-2-acetamidopropane-1,3-diol. The formula of this product is,

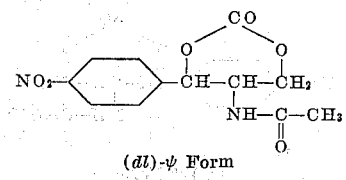

(*dl*)-ψ Form 5 g. of the cyclic carbonate of (*dl*)-ψ-1-p-nitrophenyl-2-acetamidopropane-1,3-diol is dissolved in 75 cc. of ethanol. 2.5 cc. of concentrated hydrochloric acid is added and the mixture allowed to stand at room temperature for fifteen minutes. The reaction mixture is neutralized with sodium hydroxide solution, filtered and the filtrate evaporated to dryness in vacuo. The residue is taken up in ethyl acetate, the solution filtered and the ethyl acetate distilled. The residual oil is crystallized from water and recrystallized from ethyl acetate-petroleum ether mixture to obtain the desired (dl)-ψ-1-p-nitrophenyl-2-acetamidopropane-1,3-diol; M. P. 166–7° C. The formula of this product is,

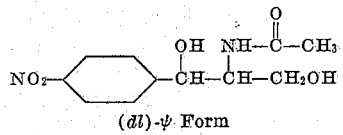

(dl)-ψ Form 2 g. of the cyclic carbonate of (dl)-ψ-1-p-nitrophenyl-2-acetamidopropane-1,3-diol is added to a mixture composed of 65 cc. of ethanol and 65 cc. of 5% sulfuric acid. The reaction mixture is heated under reflux for two hours and then the ethanol distilled from the reaction mixture. The solution is diluted with water and made alkaline with sodium hydroxide solution. The insoluble material is taken up in ethyl acetate, the ethyl acetate extracts dried and the ethyl acetate distilled to obtain the desired (dl)-ψ-1-p-nitrophenyl-2-aminopropane-1,3-diol; (M. P. 140° C.). Its formula is,

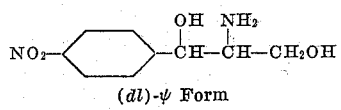

(dl)-ψ Form

Example 7

15 g. of (dl)-ψ-1-phenyl-2-acetamidopropane-1,3-diol is added in small portions with stirring to 35 cc. of thionyl chloride at room temperature, the reaction mixture allowed to stand at room temperature for one hour and then diluted with ether to precipitate the desired cyclic sulfite of (dl)-1-ψ-1-phenyl-2-acetamidopropane-1,3-diol. The formula of this product is,

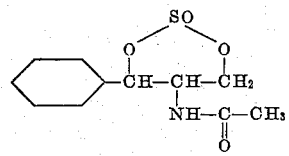

(dl)-ψ Form 14.5 g. of the cyclic sulfite of (dl)-ψ-1-phenyl-2-acetamidopropane-1,3-diol is added in small portions with stirring to 65 cc. of 100% nitric acid at −25° C. The temperature during the addition is maintained at about −20° C. by the addition of solid carbon dioxide. After the addition has been completed, the reaction mixture is poured onto cracked ice and the white insoluble sulfite of (dl)-ψ-1-p-nitrophenyl-2-acetamidopropane-1,3-diol collected and purified by recrystallization from ethanol; M. P. 165–7° C. with decomposition. The formula of this product is,

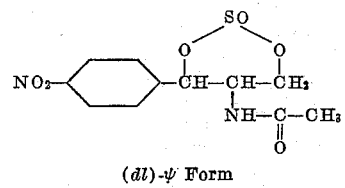

(dl)-ψ Form 6 g. of the cyclic sulfite of (dl)-ψ-1-p-nitrophenyl-2-acetamidopropane-1,3-diol is dissolved in 125 cc. of ethanol. 10 cc. of concentrated hydrochloric acid is added and the reaction mixture allowed to stand at room temperature for twenty minutes. The solution is neutralized with 10% aqueous sodium hydroxide solution and the ethanol removed by distillation in vacuo. The aqueous residue is extracted with ethyl acetate, the extracts combined and the ethyl acetate distilled. The residue is taken up in and recrystallized from a mixture of ethyl acetate and petroleum ether to obtain the desired (dl)-ψ-1-p-nitrophenyl-2-acetamidopropane-1,3-diol; M. P. 166–7° C. The formula of this product is,

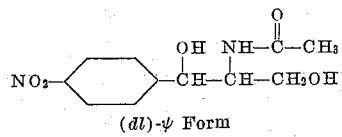

(dl)-ψ Form 4 g. of the cyclic sulfite of (dl)-ψ-1-p-nitrophenyl-2-acetamidopropane-1,3-diol is added to a mixture composed of 125 cc. of ethanol and an equal volume of 5% hydrochloric acid. The resulting mixture is heated under reflux for two hours and then evaporated to dryness in vacuo. The residue is taken up in water, the solution made alkaline with sodium hydroxide and the insoluble material recrystallized from water to obtain the desired (dl)-ψ-1-p-nitrophenyl-2-aminopropane-1,3-diol (M. P. 140° C.) of formula,

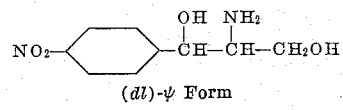

(dl)-ψ Form

Example 8

13 g. of (dl)-ψ-1-(3′-methoxyphenyl)-2-phenylacetamidopropane-1,3-diol is added in small portions with stirring to 30 cc. of thionyl chloride at room temperature. The reaction mixture is allowed to stand for one hour and then ether added to precipitate the desired cyclic sulfite of (dl)-ψ-1-(3′-methoxyphenyl)-2-phenylacetamidopropane-1,3-diol of formula,

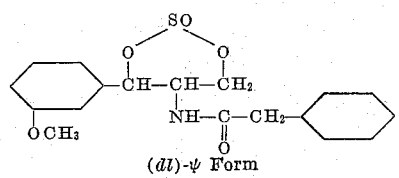

(dl)-ψ Form 9.5 g. of cyclic sulfite of (dl)-ψ-1-(3′-methoxyphenyl)-2-phenylacetamidopropane-1,3-diol is added in small portions with stirring to 50 cc. of 100% nitric acid at −20° C. The temperature during the addition is maintained at −20° C. by the addition of solid carbon dioxide to the reaction mixture. After the addition has been completed, the reaction mixture is poured onto cracked ice and the white solid cyclic sulfite of (dl)-ψ-1-(3′-methoxy-4′-nitrophenyl)-2-p-nitrophenylacetamidopropane-1,3-diol collected and purified by recrystallization from ethanol. The formula of this product is,

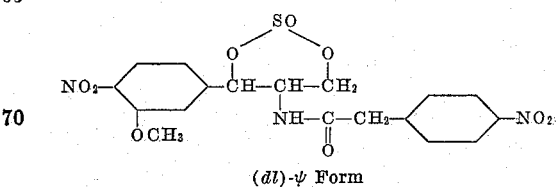

(dl)-ψ Form 5 g. of the cyclic sulfite of (dl)-ψ-1-(3′-methoxy-4′-nitrophenyl)-2-p-nitrophenylacetamidopropane-1,3-diol is dissolved in a mixture composed of 200 cc. of ethanol and an equal volume of 5% hydrochloric acid. The resulting mixture is heated under reflux for four hours and then the ethanol removed by distillation in vacuo. The aqueous residue is made alkaline with 10% sodium hydroxide solution and the insoluble material taken up in ethyl acetate. The ethyl acetate solution is dried and the ethyl acetate distilled to obtain the desired (dl)-ψ-1-(3'-methoxy-4'-nitrophenyl)-2-aminopropane-1,3-diol. The formula of this product is,

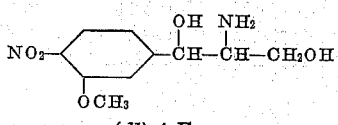

(dl)-ψ Form

*Example 9*

15 g. of (dl)-ψ-1-(2'-methylphenyl)-2-methoxy-acetamidopropane-1,3-diol is added in small portion with stirring to 40 cc. of thionyl chloride at room temperature. The reaction mixture is stirred for two hours and then diluted with ether to precipitate the desired cyclic sulfite of (dl)-ψ-1-(2'-methylphenyl) - 2 - methoxyacetamidopropane-1,3-diol of formula,

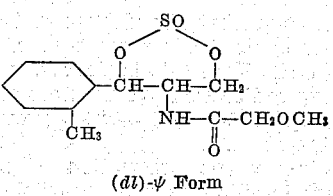

(dl)-ψ Form 14 g. of the cyclic sulfite of (dl)-ψ-1-(2'-methylphenyl) - 2 - methoxyacetamidopropane - 1,3-diol is added in small portions with stirring to 75 cc. of 100% nitric acid at —30° C. The temperature during the addition is maintained at —30° C. by the addition of small portions of solid carbon dioxide to the reaction mixture. After the addition has been completed, the reaction mixture is poured onto cracked ice and the white insoluble cyclic sulfite of (dl)-ψ-1-(2'-methyl-4'-nitrophenyl)-2-methoxyacetamidopropane - 1,3-diol collected, washed with water and purified by recrystallization from ethanol. The formula of this product is,

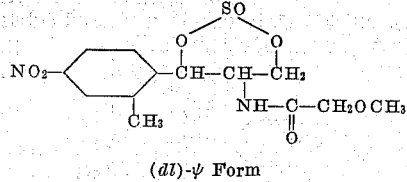

(dl)-ψ Form 10 g. of the cyclic sulfite of (dl)-ψ-1-(2'-methyl-4'-nitrophenyl)-2-methoxyacetamidopropane-1,3-diol is dissolved in 300 cc. of ethanol. 20 cc. of concentrated hydrochloric acid is added and the mixture allowed to stand at room temperature for about twenty minutes. The reaction mixture is neutralized with 10% aqueous sodium hydroxide solution and the ethanol removed by distillation in vacuo. The aqueous residue is extracted with ethyl acetate, the ethyl acetate distilled from the extracts and the residue taken up in and crystallized from water. The crystalline product so obtained is recrystallized from ethyl acetate to obtain the desired (dl)-ψ-1-(2'-methyl-4'-nitrophenyl)-2-methoxyacetamidopropane-1,3-diol in pure form. The formula of this product is,

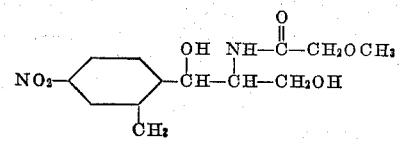

(dl)-ψ Form

*Example 10*

12 g. of phosgene is added slowly over a period of three hours to 20 g. of (l)-ψ-1-phenyl-2-benzamidopropane - 1,3-diol in 150 cc. of dry pyridine keeping the temperature in the neighborhood of 5° C. The reaction mixture is poured onto ice and the white insoluble cyclic carbonate of (l)-ψ-1-phenyl-2-benzamidopropane - 1,3 - diol collected. The product is washed with water and used without further purification in the next step. The formula of this compound is,

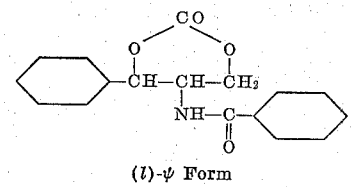

(l)-ψ Form 15 g. of the cyclic carbonate of (l)-ψ-1-phenyl-2-benzamidopropane-1,3-diol is added in small portions with stirring to 60 cc. of fuming nitric acid at —20° C. The temperature of the reaction mixture is maintained at about —20° C. during the addition by adding small quantities of solid carbon dioxide. After all of the cyclic carbonate has been added, the reaction mixture is poured onto ice and the insoluble cyclic carbonate of (l)-ψ-1-p-nitrophenyl - 2 - m - nitrobenzamidopropane-1,3-diol collected. The product is washed with water and purified by recrystallization from methanol. The formula of this compound is,

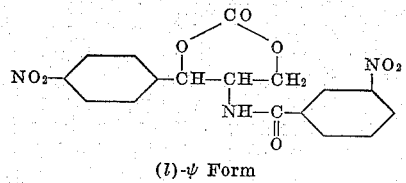

(l)-ψ Form 5 g. of the cyclic carbonate of (l)-ψ-1-p-nitrophenyl-2-m-benzamidopropane-1,3-diol is added to a mixture composed of 300 cc. of ethanol and an equal volume of 5% hydrochloric acid. The reaction mixture is heated under reflux for eight hours and then the ethanol removed by distillation in vacuo. The aqueous residue is made alkaline with sodium hydroxide solution and the insoluble product purified by recrystallization from water. The product thus obtained is (l)-ψ-1-p-nitrophenyl - 2 - aminopropane - 1,3-diol; M. P. 162-3° C.; $(\alpha)_D^{25} = -23°$ in methanol. The formula of this compound is,

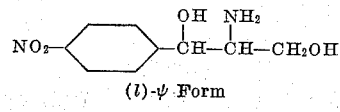

(l)-ψ Form

*Example 11*

16 g. of (dl) - ψ - 1 - (2'-chlorophenyl)-2-(α-bromopropionamido)-propane-1,3-diol is added in small portions with stirring to 50 cc. of thionyl chloride at room temperature. After the addition has been completed, the reaction mixture is allowed to stand at room temperature for two hours and then diluted with ether to precipitate the desired cyclic sulfite of (dl)-ψ-1-(2'-chlorophenyl)-2-(α-bromopropionamido)-propane-1,3-diol of formula,

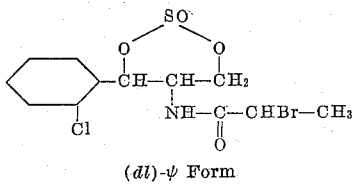

(dl)-ψ Form 8.5 g. of the cyclic sulfite of (dl)-ψ-1-(2'-chlorophenyl) - 2 - (α - bromopropionamido)propane-1,3-diol is added in small portions with stirring to 50 cc. of 100% nitric acid at —25° C. The temperature during the addition is kept at about —25° C. by the addition of small quantities of solid carbon dioxide. After all of the cyclic sulfite has been added, the reaction mixture is poured onto cracked ice and the insoluble white cyclic sulfite of (dl)-ψ-1(2' - chloro - 5' - nitrophenyl)-2 - (α-bromopropionamido)propane-1,3-diol collected. The product is washed with water and purified by recrystallization from ethanol. Its formula is,

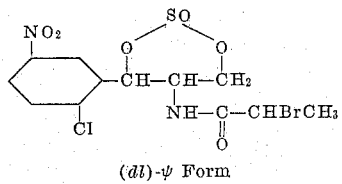

(dl)-ψ Form 6 g. of the cyclic sulfite of (dl)-ψ-1-(2'-chloro-5' - nitrophenyl)-2-(α-bromopropionamido)propane-1,3-diol is dissolved in ethanol. 15 cc. of concentrated hydrochloric acid is added and the reaction mixture allowed to stand for about ten minutes. The reaction mixture is neutralized with 10% sodium hydroxide solution and the ethanol removed by distillation in vacuo. The aqueous residue is extracted with ethyl acetate, the ethyl acetate distilled from the extracts and the residue stirred with water. The insoluble material is collected and purified by recrystallization from ethyl acetate. The product so obtained is (dl)-ψ-1-(2'-chloro - 5' - nitrophenyl)-2-(α-bromopropionamido)-propane - 1,3 - diol of formula,

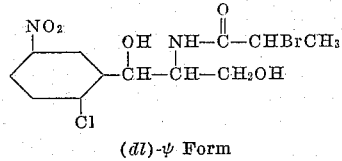

(dl)-ψ Form

What we claim is:

1. Process for the production of a 1-nitrophenyl-2-aminopropane - 1,3 - diol derivative of formula,

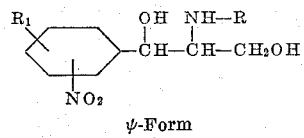

ψ-Form which comprises reacting a 1-phenyl-2-acylamidopropane-1,3-diol compound of formula,

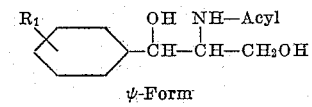

ψ-Form with a compound of the class consisting of thionyl chloride and carbonyl chloride to obtain a phenyl substituted cyclic compound of formula,

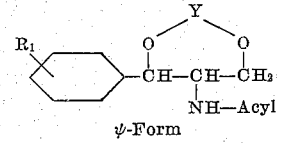

ψ-Form reacting said phenyl substituted cyclic compound with a nitrating agent of the class consisting of fuming nitric acid, 100% nitric acid and a mixture of concentrated nitric and sulfuric acids at a temperature below about 10° C. thereby nitrating the phenyl ring of said cyclic compound to obtain a nitrophenyl substituted cyclic compound of formula,

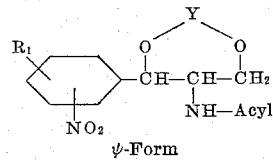

ψ-Form and subjecting said nitrophenyl substituted cyclic compound to hydrolysis in a solvent composed of water and a water-miscible organic solvent with a hydrolytic agent of the class consisting of alkali metal hydroxides, quaternary ammonium hydroxides and mineral acids; where R is a member of the class consisting of hydrogen and carboxylic acid acyl radicals, $R_1$ is a member of the class consisting of hydrogen, halogen, lower alkyl and lower alkoxy radicals; Y is a member of the class consisting of —SO— and —CO— groups and X is a chlorine atom.

2. Process for the production of a 1-nitrophenyl-2-acylamidopropane - 1,3 - diol compound of formula,

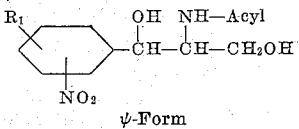

ψ-Form which comprises reacting a 1-phenyl-2-acylamidopropane-1,3-diol compound of formula,

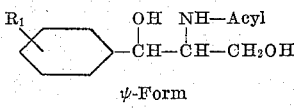

ψ-Form with a compound of the class consisting of thionyl chloride and carbonyl chloride at a temperature below about 50° C. to obtain a phenyl substituted cyclic compound of formula,

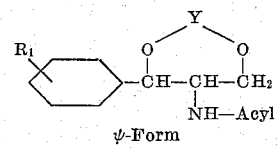

ψ-Form reacting said phenyl substituted cyclic compound with a nitrating agent of the class consisting of fuming nitric acid, 100% nitric acid and a mixture of concentrated nitric and sulfuric acids at a temperature below about 10° C. thereby nitrating the phenyl ring of said phenyl substituted cyclic compound to form a nitrophenyl substituted cyclic compound of formula,

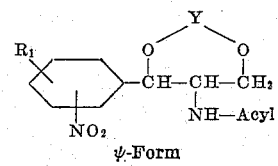

ψ-Form and subjecting said nitrophenyl substituted cyclic compound to mild hydrolysis in a solvent composed of water and a water-miscible organic solvent by heating with a dilute mineral acid for less than 10 minutes at a temperature above 50° C.; where R₁ is a member of the class consisting of hydrogen, halogen, lower alkyl and lower alkoxy radicals, Y is a member of the class consisting of —SO— and —CO— groups, acyl is carboxylic acid acyl and X is a chlorine atom.

3. Process for the production of 1-nitrophenyl-2-aminopropane-1,3-diol compound of formula,

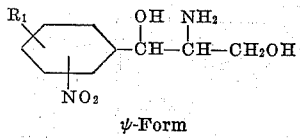

ψ-Form which comprises reacting a 1-phenyl-2-acylamidopropane-1,3-diol compound of formula,

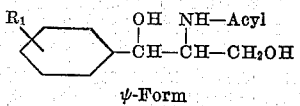

ψ-Form with a halide compound of formula,

at a temperature below about 50° C. to obtain a phenyl substituted cyclic compound of formula,

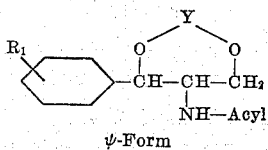

ψ-Form reacting said phenyl substituted cyclic compound with a nitrating agent of the class consisting of fuming nitric acid, 100% nitric acid and a mixture of concentrated nitric and sulfuric acids at a temperature below about 10° C. thereby nitrating the phenyl ring of said phenyl substituted cyclic compound to form a nitrophenyl substituted cyclic compound of formula,

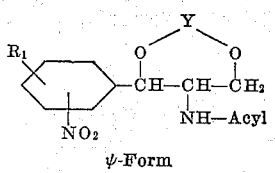

ψ-Form and completely hydrolyzing said nitrophenyl substituted cyclic compound by heating it with dilute mineral acid for at least one hour; where R₁ is a member of the class consisting of hydrogen, halogen, lower alkyl and lower alkoxy radicals, Y is a member of the class consisting of —SO— and —CO— groups, acyl is carboxylic acid acyl and X is a chlorine atom.

4. Process for the production of a 1-p-nitrophenyl-2-acylamidopropane-1,3-diol compound of formula,

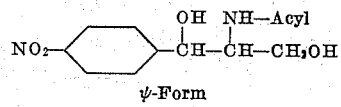

ψ-Form which comprises reacting a 1-phenyl-2-acylamidopropane-1,3-diol compound of formula,

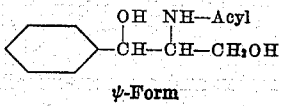

ψ-Form with thionyl chloride at a temperature between about 20° and 35° C. to obtain a phenyl substituted cyclic sulfite compound of formula,

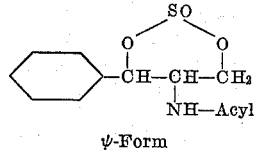

ψ-Form reacting said phenyl substituted cyclic sulfite compound with a nitrating agent of the class consisting of fuming nitric acid, 100% nitric acid and a mixture of concentrated nitric and sulfuric acids at a temperature below about 10° C. thereby nitrating the phenyl ring of said phenyl substituted cyclic sulfite compound to form a nitrophenyl substituted cyclic sulfite compound of formula,

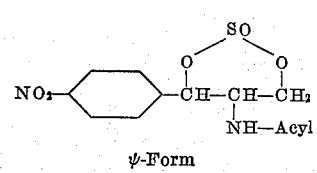

ψ-Form and subjecting said nitrophenyl substituted cyclic sulfite compound to mild hydrolysis in a solvent mixture composed of water and a water-miscible organic solvent where acyl is carboxylic acid acyl.

5. Process for the production of (l)-ψ-1-p-nitrophenyl - 2 - dichloroacetamidopropane-1,3-diol which comprises reacting (l)-ψ-1-phenyl-2-dichloroacetamidopropane-1,3-diol with thionyl chloride at a temperature between about 20° and 35° C. to obtain the cyclic sulfite of (l)-ψ-1-phenyl - 2-dichloroacetamidopropane-1,3-diol of formula,

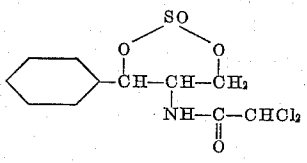

(l)-ψ-Form reacting said cyclic sulfite with a nitrating agent of the class consisting of fuming nitric acid, 100% nitric acid and a mixture of concentrated nitric and sulfuric acids at a temperature below about 10° C. thereby forming the cyclic sulfite of (l)-ψ-1 - p - nitrophenyl-2-dichloroacetamidopropane-1,3-diol of formula,

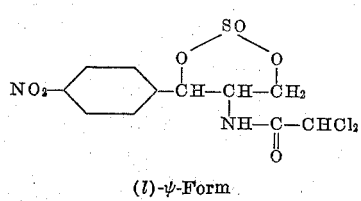

(l)-ψ-Form and subjecting said cyclic sulfite of (l)-ψ-1-p-nitrophenyl - 2-dichloroacetamidopropane-1,3-diol to mild hydrolysis in a solvent mixture composed of water and a water-miscible organic solvent with a mineral acid at a temperature below 50° C.

6. Process for the production of (dl)-ψ-1-p-nitrophenyl - 2 - dichloroacetamidopropane-1,3-diol which comprises reacting (dl)-ψ-1-phenyl-2-dichloroacetamidopropane-1,3-diol with thionyl chlorine at a temperature between about 20° and 35° C. to obtain the cyclic sulfite of (dl)-ψ-1- phenyl - 2 - dichloroacetamidopropane-1,3-diol of formula,

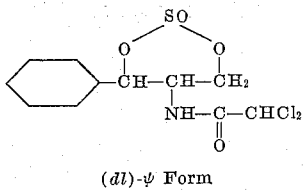

(dl)-ψ Form reacting said cyclic sulfite with a nitrating agent of the class consisting of fuming nitric acid, 100% nitric acid and a mixture of concentrated nitric and sulfuric acids at a temperature below about 10° C. thereby forming the cyclic sulfite of (dl)-ψ - 1 - p - nitrophenyl - 2-dichloroacetamidopropane-1,3-diol of formula,

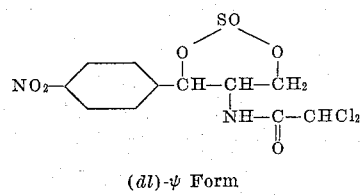

(dl)-ψ Form and subjecting said cyclic sulfite of (dl)-ψ-1-p-nitrophenyl - 2 - dichloroacetamidopropane-1,3-diol to mild hydrolysis in a solvent mixture composed of water and a water-miscible organic solvent by heating with a dilute mineral acid for less than 10 minutes at a temperature above 50° C.

7. Process for the production of (dl)-ψ-1-p-nitrophenyl - 2 - aminopropane-1,3-diol which comprises reacting (dl) - ψ - 1 - phenyl-2-acetamidopropane-1,3-diol with thionyl chloride at a temperature between about 20 and 35° C. to obtain the cyclic sulfite of (dl)-ψ-1-phenyl-2-acetamidopropane-1,3-diol of formula,

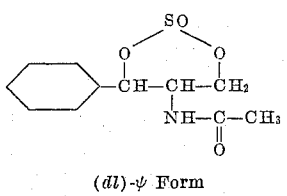

(dl)-ψ Form reacting said cyclic sulfite with a nitrating agent of the class consisting of fuming nitric acid, 100% nitric acid and a mixture of concentrated nitric and sulfuric acids at a temperature below about 10° C. thereby forming the cyclic sulfite of (dl)-ψ - 1 - p - nitrophenyl-2-acetamidopropane-1,3-diol of formula,

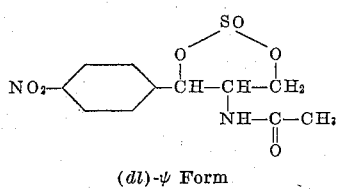

(dl)-ψ Form and completely hydrolyzing said cyclic sulfite of (dl) - ψ - 1 - p-nitrophenyl-2-acetamidopropane-1,3-diol by heating it with dilute mineral acid for at least one hour.

8. Process for the production of a 1-p-nitrophenyl - 2-acylamidopropane-1,3-diol compound of formula,

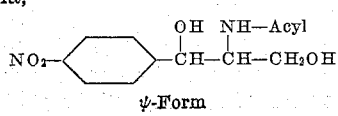

ψ-Form which comprises reacting a 1-phenyl-2-acylamidopropane-1,3-diol compound of formula,

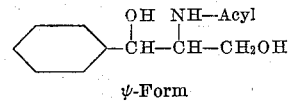

ψ-Form with phosgene at a temperature between about −10° and +10° C. in a tertiary organic amine to obtain a phenyl substituted cyclic carbonate compound of formula,

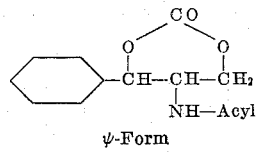

ψ-Form reacting said phenyl substituted cyclic carbonate compound with a nitrating agent of the class consisting of fuming nitric acid, 100% nitric acid and a mixture of concentrated nitric and sulfuric acids at a temperature below about 10° C. thereby nitrating the phenyl ring of said phenyl substituted cyclic carbonate compound to form a nitrophenyl substituted cyclic carbonate compound of formula,

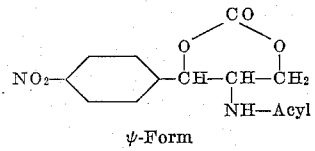

ψ-Form and subjecting said nitrophenyl substituted cyclic carbonate compound to mild hydrolysis in a solvent mixture composed of water and a water-miscible organic solvent with a mineral acid at a temperature below 50° C., where acyl is carboxylic acid acyl.

9. Process for the production of (l)-ψ-1-p-nitrophenyl - 2-dichloroacetamidopropane-1,3-diol which comprises reacting (l)-ψ-1-phenyl-2-dichloroacetamidopropane-1,3-diol with phosgene at a temperature between about −10° and +10° C. in a tertiary organic amine to obtain the cyclic carbonate of (l)-ψ-1-phenyl-2-dichloroacetamidopropane-1,3-diol of formula,

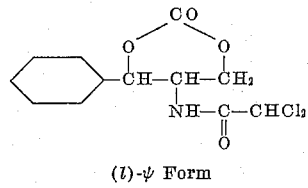

(l)-ψ Form reacting said cyclic carbonate with a nitrating agent of the class consisting of fuming nitric acid, 100% nitric acid and a mixture of concentrated nitric and sulfuric acids at a temperature below about 10° C. thereby forming the cyclic carbonate of (l) - ψ - 1-p-nitrophenyl-2-dichloroacetamidopropane-1,3-diol of formula,

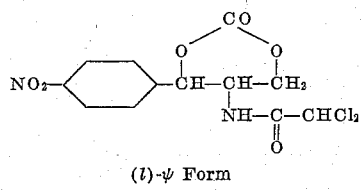

(l)-ψ Form and subjecting said cyclic carbonate of (l)-ψ-1-p - nitrophenyl - 2 - dichloroacetamidopropane-1,3-diol to mild hydrolysis in a solvent mixture composed of water and a water-miscible organic solvent with a mineral acid at a temperature below 50° C.

10. Process for the production of (dl)-ψ-1-p-nitrophenyl - 2 - dichloroacetamidopropane-1,3-diol which comprises reacting (dl)-ψ-1-phenyl-2-dichloroacetamidopropane-1,3-diol with phosgene at a temperature between about —10° and +10° C. in a tertiary organic amine to obtain the cyclic carbonate of (dl)-ψ-1-phenyl-2-dichloroacetamidopropane-1,3-diol of formula,

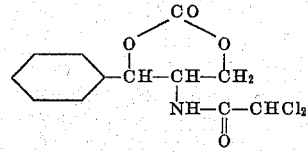

(dl)-ψ Form reacting said cyclic carbonate with a nitrating agent of the class consisting of fuming nitric acid, 100% nitric acid and a mixture of concentrated nitric and sulfuric acids at a temperature below about 10° C. thereby forming the cyclic carbonate of (dl) - ψ-1-p-nitrophenyl-2-dichloroacetamidopropane-1,3-diol of formula,

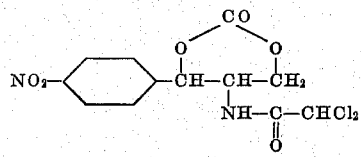

(dl)-ψ Form and subjecting said cyclic carbonate of (dl)-ψ-1-p - nitrophenyl - 2 - dichloroacetamidopropane-1,3-diol to mild hydrolysis in a solvent mixture composed of water and a water-miscible organic solvent with a mineral acid at a temperature below 50 C.

11. Process which comprises reacting a heterocyclic compound of formula

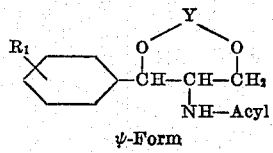

ψ-Form with a nitrating agent of the class consisting of fuming nitric acid, 100% nitric acid and a mixture of concentrated nitric and sulfuric acids at a temperature below about 10° C. thereby obtaining the corresponding nitro phenyl heterocyclic compound of formula

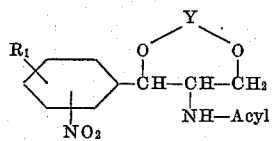

ψ-Form where $R_1$ is a member of the class consisting of hydrogen, halogen, lower alkyl and lower alkoxy radicals, Y is a member of the class consisting of —SO— and —CO— groups, acyl is carboxylic acid acyl and X is a halogen atom.

12. Process which comprises reacting a compound having the formula

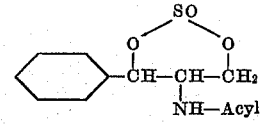

ψ-Form with a nitrating agent of the class consisting of fuming nitric acid, 100% nitric acid and a mixture of concentrated nitric and sulfuric acids at a temperature below about 10° C. thereby obtaining the corresponding nitro phenyl heterocyclic compound of formula

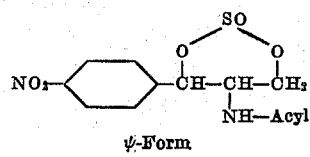

ψ-Form where acyl is carboxylic acid acyl.

References Cited in the file of this patent
UNITED STATES PATENTS

| Number | Name | Date |
|---|---|---|
| 2,513,346 | Moersch et al. | July 4, 1950 |
| 2,587,641 | Moersch et al. | Mar. 4, 1952 |